United States Patent
Messersmith et al.

(10) Patent No.: US 10,829,393 B2
(45) Date of Patent: *Nov. 10, 2020

(54) WATER DETOXIFICATION BY A SUBSTRATE-BOUND CATECHOLAMINE ADSORBENT

(71) Applicant: Northwestern University, Evanston, IL (US)

(72) Inventors: Phillip B. Messersmith, Clarendon Hills, IL (US); Haeshin Lee, Daejeon (KR)

(73) Assignee: Northwestern University, Evanston, IL (US)

(*) Notice: Subject to any disclaimer, the term of this patent is extended or adjusted under 35 U.S.C. 154(b) by 34 days.

This patent is subject to a terminal disclaimer.

(21) Appl. No.: 16/154,624

(22) Filed: Oct. 8, 2018

(65) Prior Publication Data
US 2019/0177182 A1    Jun. 13, 2019

Related U.S. Application Data

(60) Continuation of application No. 15/090,222, filed on Apr. 4, 2016, now Pat. No. 10,093,557, which is a
(Continued)

(51) Int. Cl.
*C02F 1/28* (2006.01)
*B01J 20/26* (2006.01)
(Continued)

(52) U.S. Cl.
CPC ............. *C02F 1/288* (2013.01); *B01J 20/262* (2013.01); *B01J 20/28016* (2013.01);
(Continued)

(58) Field of Classification Search
CPC .......... C02F 1/285; C02F 1/286; C02F 1/288; C02F 2101/006; C02F 2101/20;
(Continued)

(56) References Cited

U.S. PATENT DOCUMENTS 6,038,527 A    3/2000   Renz
8,541,060 B2   9/2013   Messersmith
(Continued)

FOREIGN PATENT DOCUMENTS

KR    20120114008 A    10/2012
WO    2008049108 A1    4/2008

OTHER PUBLICATIONS

Akyuz, et al., FT-IR and FT-RAMAN Spectroscopic Study of Surface Species of 2-Aminopyridine Adsorbed by Sepiolite From Anatolia, Journal of Structural Chemistry, 1999, 40(5):796-801.
(Continued)

*Primary Examiner* — Matthew O Savage
(74) *Attorney, Agent, or Firm* — Quarles & Brady LLP

(57) ABSTRACT

A bio-inspired method for detoxifying contaminated water is disclosed. In the method, polydopamine, a mussel-inspired adhesive catecholamine was used as an adsorbent to effectively remove from contaminated water three major classes of toxic agents: heavy metal ions (e.g., Cr, Hg, Pb, Cu, and Cd), toxic organic species (e.g., 4-aminopyridine), and radioisotopes (e.g., Lutetium-177). Furthermore, the polydopamine adsorbent was regenerated by treatment with acid or hydrogen peroxide.

8 Claims, 8 Drawing Sheets

Related U.S. Application Data division of application No. 14/013,247, filed on Aug. 29, 2013, now Pat. No. 9,302,921.

(60) Provisional application No. 61/694,383, filed on Aug. 29, 2012.

(51) Int. Cl.
    *B01J 20/32*     (2006.01)
    *B01J 20/34*     (2006.01)
    *B01J 20/28*     (2006.01)
    *C02F 101/22*     (2006.01)
    *C02F 101/00*     (2006.01)
    *C02F 101/20*     (2006.01)
    *C02F 101/30*     (2006.01)
    *C02F 101/38*     (2006.01)

(52) U.S. Cl.
CPC ..... *B01J 20/28019* (2013.01); *B01J 20/3204* (2013.01); *B01J 20/3206* (2013.01); *B01J 20/3208* (2013.01); *B01J 20/3272* (2013.01); *B01J 20/3293* (2013.01); *B01J 20/345* (2013.01); *B01J 20/3475* (2013.01); *C02F 1/285* (2013.01); *C02F 1/286* (2013.01); *C02F 2101/006* (2013.01); *C02F 2101/20* (2013.01); *C02F 2101/22* (2013.01); *C02F 2101/30* (2013.01); *C02F 2101/38* (2013.01); *C02F 2303/16* (2013.01)

(58) Field of Classification Search
CPC .............. C02F 2101/22; C02F 2101/30; C02F 2101/38; C02F 2303/16; B01J 20/262; B01J 20/28016; B01J 20/28019; B01J 20/3208; B01J 20/3204; B01J 20/3206; B01J 20/3272; B01J 20/3293; B01J 20/345; B01J 20/3475

See application file for complete search history.

(56) References Cited

U.S. PATENT DOCUMENTS

| | | | | |
|---|---|---|---|---|
| 10,093,557 | B2* | 10/2018 | Messersmith | ........... C02F 1/285 |
| 2006/0085477 | A1 | 4/2006 | Phillips et al. | |
| 2008/0118162 | A1 | 5/2008 | Siegemund | |
| 2008/0149566 | A1* | 6/2008 | Messersmith | ........ C09D 5/1681 |
| | | | | 210/702 |
| 2008/0263023 | A1 | 10/2008 | Vailaya et al. | |
| 2009/0123652 | A1 | 5/2009 | Messersmith et al. | |
| 2013/0157905 | A1 | 6/2013 | Saini | |

OTHER PUBLICATIONS

Babel, et al., Low-Cost Adsorbents for Heavy Metals Uptake from Contaminated Water: A Review, Journal of Hazardous Materials, 2003, B97(1-3):219-243.
Babic, et al., Adsorption of Zinc, Cadmium and Mercury Ions from Aqueous Solutions on an Activated Carbon Cloth, Carbon, 2002, 40(7):1109-1115.
Bindoli, et al., Biochemical and Toxicological Properties of the Oxidation Products of Catecholamines, Free Radical Biology and Medicine, 1992, 13(4):391-405.
Burzio, et al., Cross-Linking in Adhesive Quinoproteins: Studies with Model Decapeptides, Biochemistry, 2000, 39(36):11147-11153.
Buyukmurat, et al., Theoretical and Experimental Studies of IR Spectra of 4-aminopyridine Metal(II) Complexes, Journal of Molecular Structure, 2003, 651-653:533-539.
Cavalieri, et al., Catechol Ortho-Quinones: The Electrophilic Compounds that Form Depurinating DNA Adducts and Could Initiate Cancer and Other Diseases, Carcinogenesis, 2002, 23(6):1071-1077.
Cuesta, et al., Chemical Transformations Resulting from Pyrolysis and CO2 Activation of Kevlar Flocks, Carbon, 1997, 35(7):967-976.
Davis, et al., A Review of the Biochemistry of Heavy Metal Biosorption by Brown Algae, Water Research, 2003, 37:4311-4330.
Ehrhardt, et al., Reactor-Produced Radionuclides at the University of Missouri Research Reactor, Applied Radiation and Isotopes, 1998, 49(4):295-297.
Fowler, Critical Review of Selected Heavy Metal and Chlorinated Hydrocarbon Concentrations in the Marine Environment, Marine Environmental Research, 1990, 29(1):1-64.
Fu, et al., XPS Study of Copper-Doped Carbon Aerogels, Langmuir, 2002, 18(26):10100-10104.
Gardner-Outlaw, et al., Sustaining Water, Easing Scarcity: A Second Update—Revised Data for the Population Action International Report, Sustaining Water: Population and the Future of Renewable Water Supplies, Copyright Population Action International, 1997, 20 pages.
Gray, Chapter 20, Physico-chemical Treatment Processes, Water Technology An Introduction for Environmental Scientists and Engineers, Second Edition, Elsevier Butterworth Heinemann, 2005, pp. 535-571.
Greenfield, Rain Scavenging of Radioactive Particulate Matter from the Atmosphere, J. Meteor., 1957, 14:115-125.
Ham, et al., Facile DNA Immobilization on Surfaces Through a Catecholamine Polymer, Angew. Chem. Int. Ed., 2011, 50:732-736.
Hamadi, et al., Adsorption Kinetics for the Removal of Chromium(VI) From Aqueous Solution by Adsorbents Derived from Used Tyres and Sawdust, Chemical Engineering Journal, 2001, 84(2):95-105.
Hamdy, Biosorption of Heavy Metals by Marine Algae, Current Microbiology, 2000, 41:232-238.
Heacock, et al., The Infrared Spectra of Secondary Amines and Their Salts, Canadian Journal of Chemistry, 1956, 34:1782-1795.
Holten-Andersen, et al., pH-induced Metal-Ligand Cross-Links Inspired by Mussel Yield Self-Healing Polymer Networks with Near-Covalent Elastic Moduli, PNAS, 2011, 108(7):2651-2655.
Hong, et al., Attenuation of the In Vivo Toxicity of Biomaterials by Polydopamine Surface Modification, Nanomedicine, 2011, 6(5):793-801.
Huang, et al., Adsorption of Cu(II) and Ni(II) by Pelletized Biopolymer, Journal of Hazardous Materials, 1996, 45 (2-3):265-277.
Hwang, et al., Protein- and Metal-Dependent Interactions of a Prominent Protein in Mussel Adhesive Plaques, Journal of Biological Chemistry, 2010, 285(33):25850-25858.
Jeon, et al., Novel Immobilization of Alginic Acid for Heavy Metal Removal, Biochemical Engineering Journal, 2002, 11(2-3):159-166.
Kang, et al., One-Step Modification of Superhydrophobic Surfaces by a Mussel-Inspired Polymer Coating, Angew. Chem. Int. Ed. Engl., 2010, 49(49):9401-9404.
Kang, et al., Simultaneous Reduction and Surface Functionalization of Graphene Oxide by Mussel-Inspired Chemistry, Advanced Functional Materials, 2011, 21:108-112.
Kang, et al., One-Step Multipurpose Surface Functionalization by Adhesive Catecholamine, Adv. Fund. Mater., 2012, 22:2949-2955.
Korytowski, et al., Bleaching of Melanin Pigments, Journal of Biological Chemistry, 1990, 265(21):12410-12416.
Ku et al, Human Endothelial Cell Growth on Mussel-Inspired Nanofiber Scaffold for Vascular Tissue Engineering, Biomaterials, 2010, 31:9431-9437.
Lambert, et al., Chapter 8, Group Frequencies: Infrared and Raman, Organic Structural Spectroscopy, Prentice Hall, Inc., New Jersey, 1998, 175-200.
Lee, et al., Single-Molecule Mechanics of Mussel Adhesion, PNAS, 2006, 103(35):12999-13003.
Lee, et al., Mussel-Inspired Surface Chemistry for Multifunctional Coatings, Science, 2007, 318(5849):426-430.
Leyva-Ramos, et al., Adsorption of Cadmium(II) From Aqueous Solution Onto Activated Carbon, Water Science and Technology, 1997, 35(7):205-211.

(56) References Cited

OTHER PUBLICATIONS

Leyva-Ramos, et al., Adsorption of Cadmium(II) From an Aqueous Solution Onto Activated Carbon Cloth, Separation Science and Technology, 2005, 40(10):2079-2094.

Liao, et al., A Facile Method for Preparing Highly Conductive and Reflective Surface-Silvered Polyimide Films, Applied Surface Science, 2009, 255(19):8207-8212.

Liu, Bifunctional Coupling Agents for Radiolabeling of Biomolecules and Target-Specific Delivery of Metallic Radionuclides, Adv. Drug Deliv. Rev., 2008, 60(12):1347-1370.

Mason, et al., Melanoproteins I. Reactions Between Enzyme-Generated Quinones and Amino Acids, Biochim. Biophys. Acta, 1965, 3:134-146.

Meredith, et al., Intraperitoneal Radioimmunotherapy of Ovarian Cancer with Lutetium-177-CC49, J. Nucl. Med., 1996, 37:1491-1496.

Nicoll, IISS Strategic Comments, The Fallout from Fukushima, The International Institute for Strategic Studies, vol. 17, Comment 20, May 2011, pp. 17-19.

Ou, et al., Self-Assembly and Tribological Property of a Novel 3-Layer Organic Film on Silicon Wafer with Polydopamine Coating as the Interlayer, J. Phys. Chem C, 2009, 113(47):20429-20434.

Reed, et al., Use of Granular Activated Carbon Columns for Lead Removal, Journal of Environmental Engineering, 1994, 120(2):416-436.

Ryou, et al., Mussel-Inspired Polydopamine-Treated Polyethylene Separators for High-Power Li-Ion Batteries, Advanced Materials, 2011, 23(27):3066-3070.

Schafer, Jr., et al., A Summary of the Acute Toxicity of 4-Aminopyridine to Birds and Mammals, Toxicology and Applied Pharmacology, 1973, 26:532-538.

Sever, et al., Metal-Mediated Cross-Linking in the Generation of a Marine-Mussel Adhesive, Angewandte Chemie International Edition, 2004, 43(4):448-450.

Shen, et al., Organometallic Chemistry at the Magnesium Tris(8-hydroxyquinolino)aluminum Interface, J. Am. Chem. Soc., 2000, 122:5391-5392.

Shim, et al., Effect of Modification with HNO3 and NaOH on Metal Adsorption by Pitch-Based Activated Carbon Fibers, Carbon, 2001, 39(11):1635-1642.

Sriwanthana, et al., Single-Step Purification of Proteus Mirabilis Urease Accessory Protein UreE, a Protein with a Naturally Occurring Histidine Tail, by Nickel Chelate Affinity Chromatography, Journal of Bacteriology, 1994, 176 (22):6836-6841.

Szefer, et al., Distribution and Relationships of Trace Metals in Soft Tissue, Byssus and Shells of Mytilus Edulis Trossulus from the Southern Baltic, Environmental Pollution, 2002, 120(2):423-444.

Tait, et al., Metal-Organic Coordination Interactions in Fe-Terephthalic Acid Networks on Cu(100), J. Am. Chem. Soc., 2008, 130:2108-2113.

Taylor, et al., Polarographic and Spectrophotometric Investigation of Iron(III) Complexation to 3,4-Dihydroxyphenylalanine-Containing Peptides and Proteins from Mytilus Edulis, Inorg. Chem., 1994, 33:5819-5824.

Waite, et al., Polyphosphoprotein from the Adhesive Pads of Mytilus Edulis, Biochemistry, 2001, 40:2887-2893.

Yap, et al., Can the Byssus of Green-Lipped Mussel *Perna viridis* (Linnaeus) from the West Coast of Peninsular Malaysia be a Biomonitoring Organ for Cd, Pb and Zn? Field and Laboratory Studies, Environment International, 2003, 29(4):521-528.

Ye, et al., Electrochemical Growth of Flowerlike Gold Nanoparticles on Polydopamine Modified ITO Glass for SERS Application, Electrochimica Acta, 2010, 55(6):2004-2009.

PCT International Search Report and Written Opinion, PCT/US2013/057201, dated Nov. 6, 2013.

\* cited by examiner

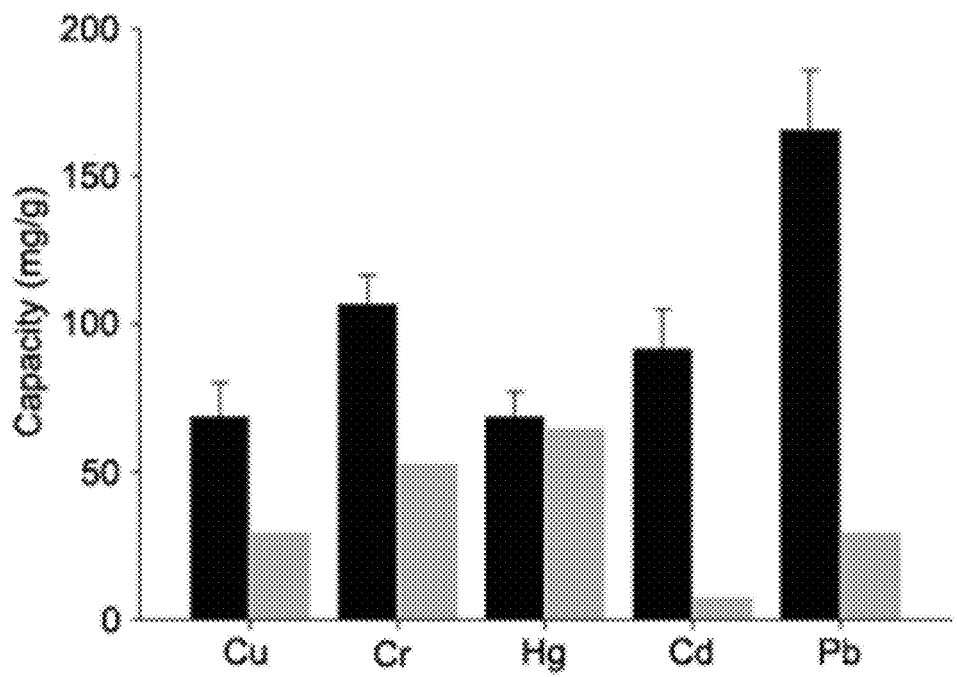
Figure 2A
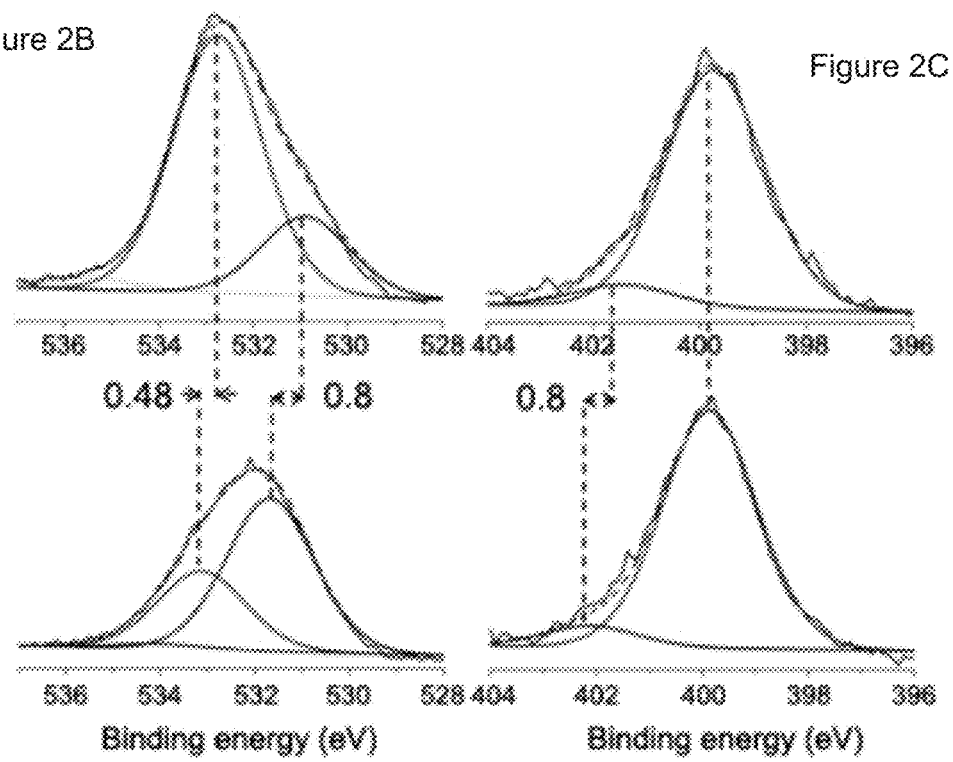
Figure 2B
Figure 2C

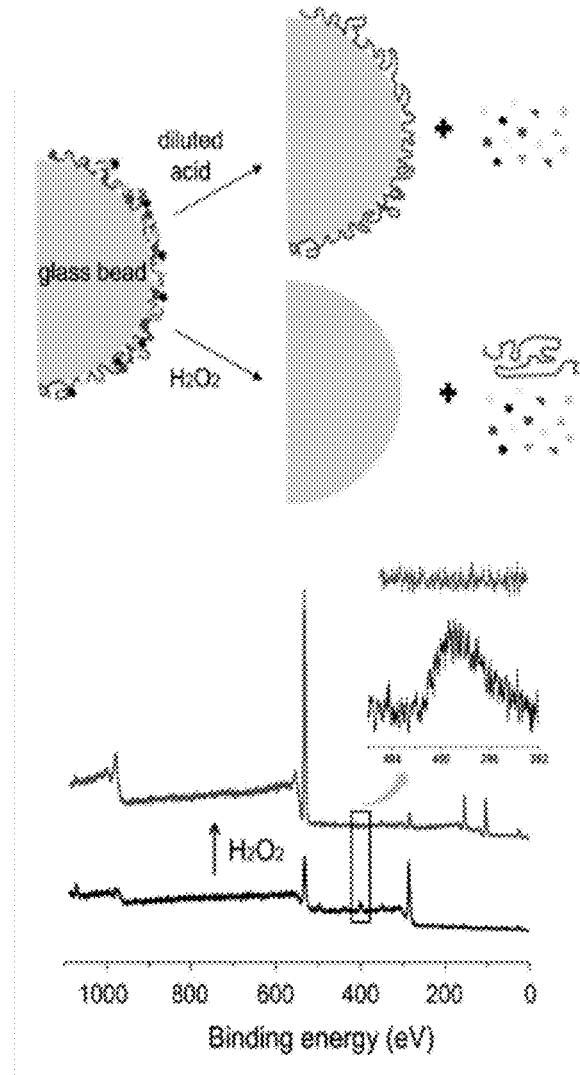
Figure 5A
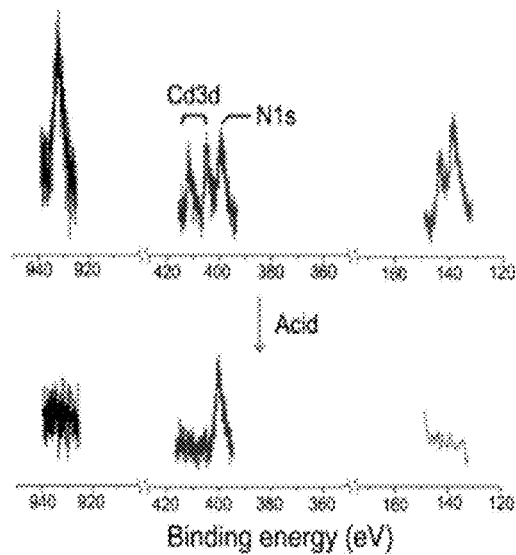
Figure 5B
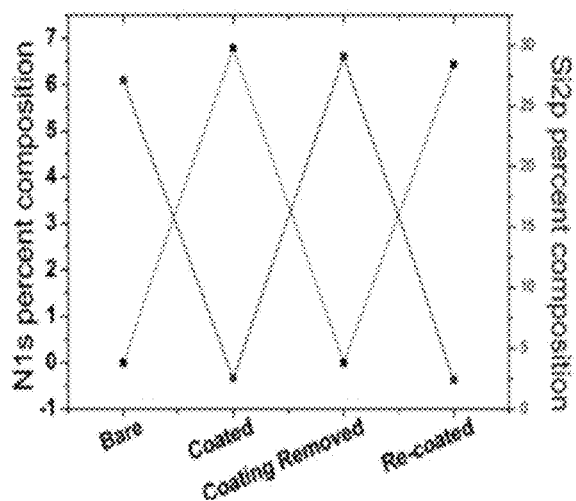
Figure 5C
Figure 5D

Binding Energy(eV)

Binding Energy(eV)

WATER DETOXIFICATION BY A SUBSTRATE-BOUND CATECHOLAMINE ADSORBENT

CROSS-REFERENCE TO RELATED APPLICATIONS

This application is a continuation of U.S. patent application Ser. No. 15/090,222, filed Apr. 4, 2016, which is a divisional of U.S. patent application Ser. No. 14/013,247 filed Aug. 29, 2013, now U.S. Pat. No. 9,302,921, which claims benefit of U.S. Patent Application 61/694,383 filed Aug. 29, 2012, which is incorporated by reference herein in its entirety.

STATEMENT REGARDING FEDERALLY-SPONSORED RESEARCH OR DEVELOPMENT

This invention was made with government support under R37 DE014193 awarded by the National Institutes of Health. The government has certain rights in the invention.

FIELD OF THE INVENTION

This invention is directed to technologies that can effectively purify contaminated water.

BACKGROUND OF THE INVENTION

Ensuring an adequate supply of clean water is an urgent global issue. The demand for clean water will continue to increase due to industrialization and population growth. Thus, the development of technologies that can effectively purify contaminated water has been an emerging area of research.

Adsorption-based technologies have been used to remove a variety of toxic chemicals from contaminated water via batch or continuous flow processes. The carboxyl and amine groups of activated carbon and polysaccharides such as alginate and chitosan are the most widely implemented adsorbents due to their ability to chelate toxic heavy metals. However, several limitations of existing absorbents can be identified.

First, the attachment of polysaccharides onto solid phases is essential, yet these adsorbents lack inherent adhesive properties to facilitate their immobilization onto substrates. As a result, complex multi-step chemical modifications of polysaccharides are required for surface immobilization, and implementing these methods on a wide variety of substrate surfaces is challenging.

Second, the generation of secondary pollutants during chemical processing of adsorbents is a serious environmental issue. In the case of activated carbon adsorbent, a strongly acidic solution (typically 10-50% (v/v) $HNO_3$) has been used, whereas a variety of toxic chemicals and solvents have been used for chemical modification of the polysaccharide adsorbents.

Third, the variety of toxic chemicals that can be removed by existing adsorbents is limited. They often show excellent performance in the removal of heavy metals, but perform poorly in the removal of toxic organic molecules, particularly in the case of polysaccharide adsorbents.

Fourth, methods for regenerating adsorbents and isolating adsorbed toxic chemical complexes have not been adequately developed.

Finally, the cost of carbon materials is rapidly increasing, a particular concern for developing regions and resource-poor settings.

Thus, novel approaches to overcome the aforementioned limitations, in whole or in part, are needed for improved and more cost-effective water detoxification.

BRIEF DESCRIPTION

We disclose herein an effective method for removing contaminants from water using polydopamine polymers. Such polymers combine surface adhesion with the ability to isolate, bind and sequester heavy metals and other toxins.

Accordingly, we disclose a method for removing one or more contaminants from water. The method includes the step of contacting the water with an adsorbent comprising a polydopamine polymer. Upon performing the method, the one or more contaminants in the water are adsorbed to the polydopamine polymer and thus removed from the water.

In certain embodiments, the polydopamine polymer is the polymer obtained by contacting a substrate surface with an alkaline solution comprising dopamine. In certain embodiments, the adsorbent is coated onto a substrate surface.

In certain embodiments, the substrate is glass, a metal, an oxide, a semiconductor, a ceramic, and/or a synthetic polymer. In some such embodiments, the substrate is a glass bead.

In certain embodiments, the water is contacted with the adsorbent by batch or continuous flow.

Optionally, the method may include the additional step of regenerating the adsorbent by contacting the adsorbent with dilute acid. This step may result in removal of at least some of the contaminants from the adsorbent. In some such embodiments, the dilute acid is acetic acid.

Optionally, the method may include the additional step of removing the adsorbent and the adsorbed contaminants from the substrate surface by contacting the adsorbent with hydrogen peroxide. In some such embodiments, the method may also include the step of coating fresh adsorbent onto the substrate surface after the old adsorbent has been removed.

In some embodiments, the one or more contaminants that are removed from the water include one or more of a metal ion, an organic compound, or a radioisotope. In embodiments where a metal ion is removed, the metal ion is optionally the ion of a toxic metal. Non-limiting examples of toxic metal ions that could be removed using the method include copper (II), chromium (VI), mercury (II), cadmium (II), and lead (II).

In embodiments where an organic compound is removed, the organic compound may be toxic. A non-limiting example of a toxic organic compound that could be removed using the method is 4-aminopyridine. A non-limiting example of a radioisotope that could be removed using the method is lutetium-177.

Further objects, features and advantages of the disclosed method will be apparent from the following detailed description when taken in conjunction with the accompanying drawings.

BRIEF DESCRIPTION OF THE DRAWINGS

FIG. 2A. The toxic metal binding capacity of polydopamine (black, n=3) compared to activated carbon (grey);

FIG. 2B. XPS analysis (O1s) of polydopamine before (top) and after (bottom) Cu(II) metal binding;

FIG. 2C. XPS analysis (N1s) of polydopamine before (top) and after (bottom) Cr(IV) metal binding.

FIG. 5A. Regeneration of polydopamine adsorbent after exposure to toxic metal. Acid treatment (10% acetic acid, v/v) dissociates the bound toxic metals from the polydopamine/metal complexes, whereas treatment with hydrogen peroxide removes adsorbed metal as well as polydopamine.

FIG. 5B. Regeneration of polydopamine adsorbent after exposure to toxic metal. XPS analysis before (above) and after (below) acetic acid treatment showed removal of Cu2p (left, 932.6 eV), Cd3d (center, 408.0 and 411.7 eV), and Pb4f (center, 138.3 eV), however the characteristic N1s peak of polydopamine was preserved (right, 398.1 eV, after acid treatment).

FIG. 5C. Regeneration of polydopamine adsorbent after exposure to toxic metal. Hydrogen peroxide effectively removed the polydopamine coating from glass surface. The disappearance of N1s and reappearance of Si2p and Si2s demonstrated the polydopamine layer removal.

FIG. 5D. Regeneration of polydopamine adsorbent after exposure to toxic metal. Deposition and removal of polydopamine can be repeated, as shown by a plot of N1s and Si2p percent composition as detected by XPS analysis.

DETAILED DESCRIPTION

I. Introduction

In the specification and in the claims, the terms "including" and "comprising" are open-ended terms and should be interpreted to mean "including, but not limited to . . . " These terms encompass the more restrictive terms "consisting essentially of" and "consisting of."

As used herein and in the appended claims, the singular forms "a," "an," and "the" include plural reference unless the context clearly dictates otherwise. As well, the terms "a" (or "an"), "one or more" and "at least one" can be used interchangeably herein. It is also to be noted that the terms "comprising," "including," "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes, including for describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

While multiple embodiments are disclosed, still other embodiments will become apparent to those skilled in the art from the following detailed description. As will be apparent, the disclosed method is capable of modifications in various obvious aspects, all without departing from its spirit and scope. Accordingly, the detailed description is to be regarded as illustrative in nature and not restrictive.

II. The Invention

The present disclosure provides a bio-inspired method for detoxifying contaminated water. In the disclosed examples, three major classes of toxic agents, heavy metal ions (e.g., Cr, Hg, Pb, Cu, and Cd), toxic organic species (e.g., 4-aminopyridine), and a radioisotope (e.g., Lutetium-177) were effectively removed from contaminated water using polydopamine, a mussel-inspired adhesive catecholamine. In addition, the polydopamine adsorbent was easily regenerated by treatment with acid or hydrogen peroxide.

Figure 1A:
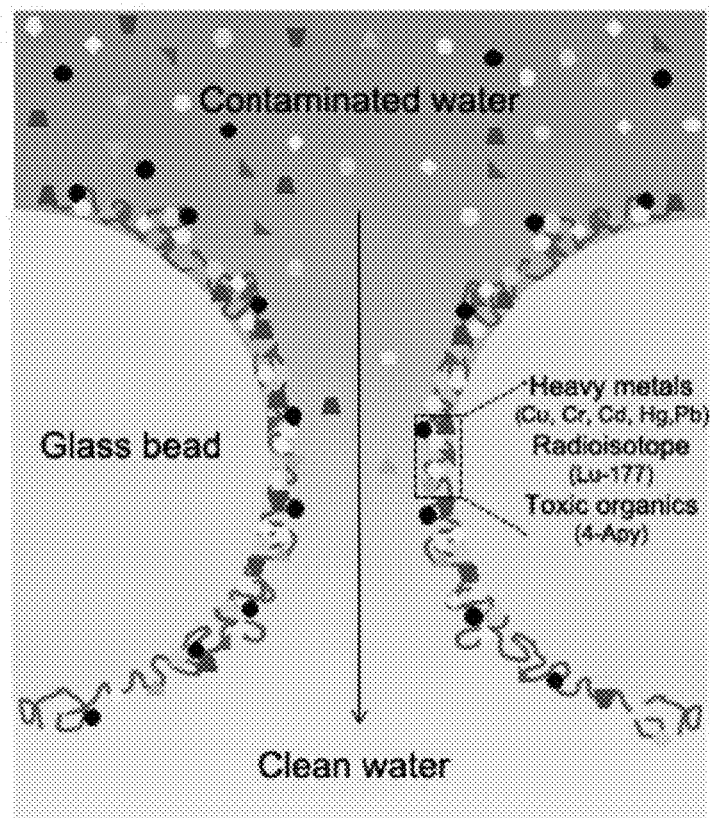
FIG. 1A. A schematic description of detoxification process by polydopamine. Water contaminated by heavy metals, radioisotopes, and organic compounds is passed through a packed column of polydopamine-coated beads.
Figure 1B:
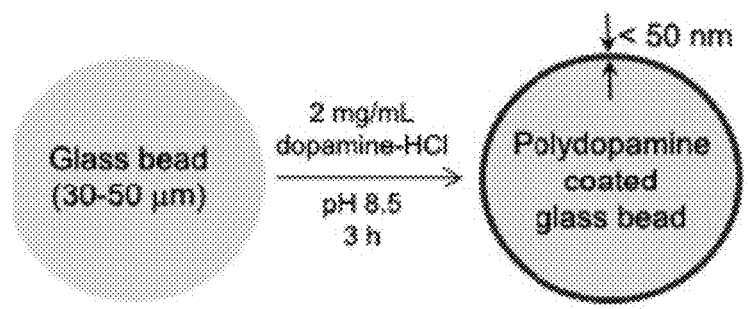
FIG. 1B. A schematic description of polydopamine coating process.
Figure 1C:
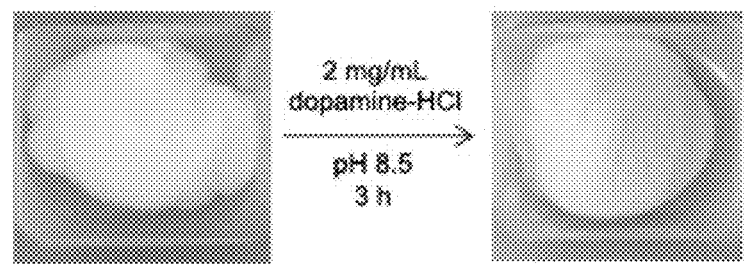
FIG. 1C. Photographs of glass beads (left) and polydopamine-coated beads (right).

Mussels secrete adhesive materials that are primarily made from proteins in which an unusual amino acid, 3,4-dihydroxy-L-phenylalanine, also known as L-DOPA, has been found. Polydopamine is a synthetic mimic of mussel adhesive proteins that deposits as a thin (monolayer to 50 nm or more) coating on virtually any material by spontaneous oxidation of dopamine in an alkaline aqueous solution (FIGS. 1b and 1c). See H. Lee, S. M. Dellatore, W. M. Miller, P. B. Messersmith, Science 2007, 318, 426-430. Compared to other methods of coating substrates, polydopamine has the advantage of being inexpensive, adherent, and simple to deposit onto substrates without the need for surface pre-treatment. Polydopamine nanolayers form on virtually any material surface, including noble metals, oxides, semiconductors, ceramics, synthetic polymers, and graphene oxide, as well as on superhydrophobic surfaces. The inventors demonstrate herein that the catecholamines that do not participate in surface binding can perform a variety of chemical reactions that result in water detoxification.

The following example is offered for illustrative purposes only, and is not intended to limit the scope of the present invention in any way. Indeed, various modifications of the invention that fall within the scope of the appended claims in addition to those shown and described herein will become apparent to those skilled in the art from the foregoing description and the following example.

III. Example

A. General Procedure, Results, and Discussion

Figure 6:
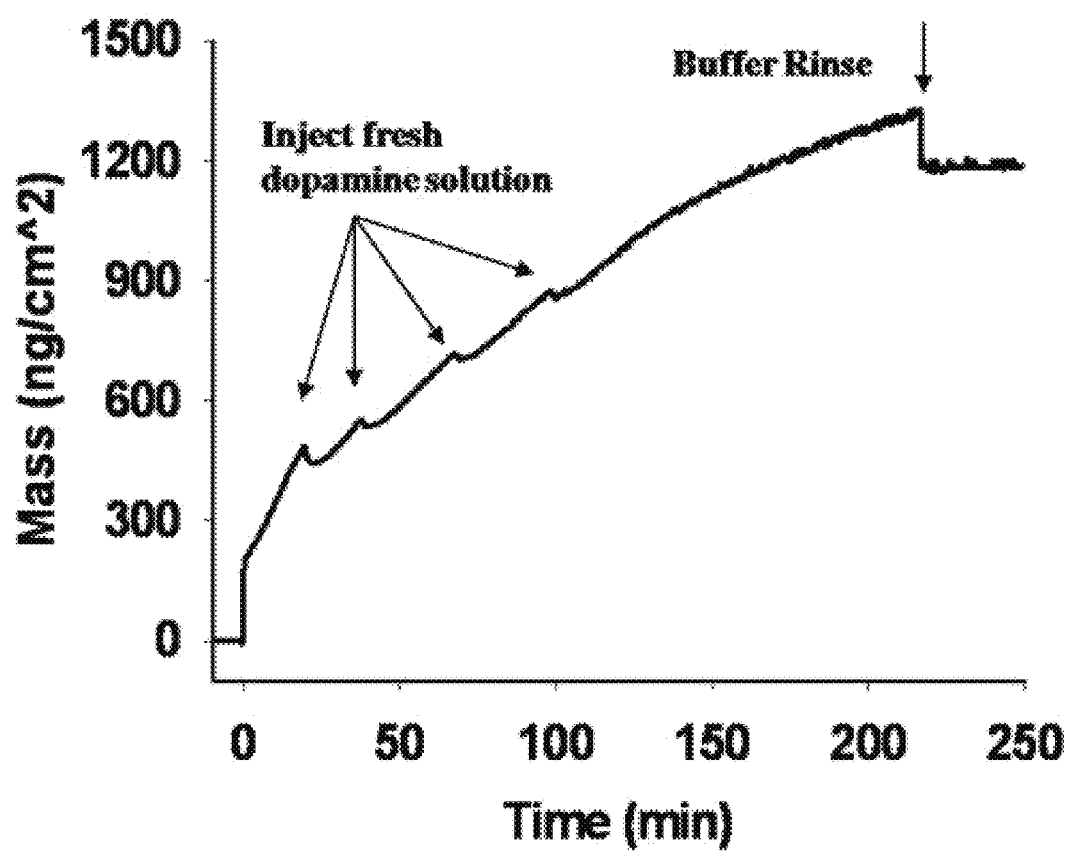
FIG. 6. Determination of adsorbed mass of polydopamine by OWLS analysis.

We chose glass beads as the material to be functionalized by polydopamine. Briefly, glass beads were dispersed in an alkaline dopamine solution (2 mg dopamine·HCl in 1 mL of 10 mM tris buffer, pH 8.5) for 3 h (FIGS. 1b and 1c), and the resulting polydopamine-coated glass beads (polydopamine/glass beads) were packed by gravity into a column and rinsed extensively with distilled water. The amount of polydopamine on the glass beads was estimated by optical waveguide lightmode spectroscopy (OWLS). Under conditions identical to those used in preparation of the polydopamine coated glass beads, a glass OWLS sensor surface was coated with 1180 ng/cm$^2$ after 3 hours (FIG. 6). Using this number along with the known specific surface area (305.1 cm$^2$/g) of the glass beads, we were able to estimate that 360 μg polydopamine was deposited per gram of glass bead.

In a typical experiment, an aqueous solution containing heavy metal ions was passed through the column (FIG. 1a) and the eluate was analyzed by inductively coupled plasma-optical emission spectroscopy (ICP-OES) to determine the remaining concentration of each metal species. Passage of 10 ppm solutions of $Cr^{VI}$, $Hg^{II}$, $Pb^{II}$, $Cu^{II}$, and $Cd^{II}$ through a column containing 0.1 g of polydopamine glass beads reduced the metal ion concentration below the detection limit of ICP-OES (<0.05 ppm). The metal binding capacity of the polydopamine beads was determined by continuing the filtration until the unbound ions were detected. The results show that the capacity is comparable to or better than a widely used activated carbon material for all of the toxic metals tested ($Cu^{II}$, $Cr^{VI}$, $Hg^{II}$, $Cd^{II}$ and $Pb^{II}$), as shown in FIG. 2a. These results indicate that polydopamine is a promising adsorbent for removal of toxic heavy metal ions.

Figure 7A:
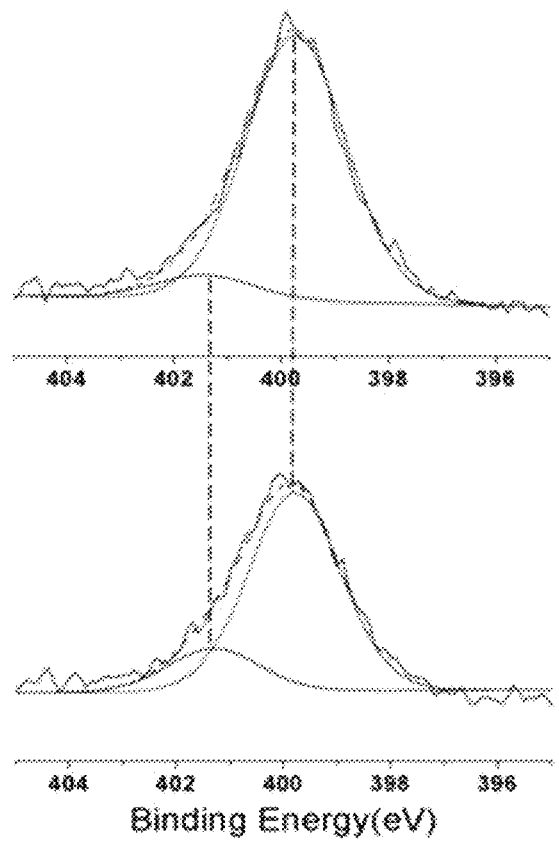
FIG. 7A. No change in binding energy of N1s was observed upon Cu$^{II}$ adsorption, indicating that the nitrogen was not participating in the Cu$^{II}$ chelation with polydopamine.
Figure 7B:
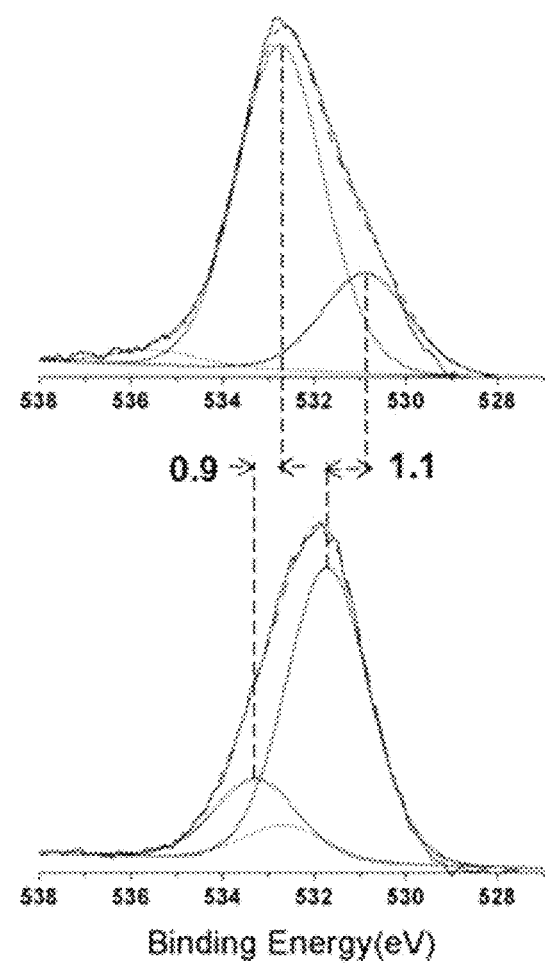
FIG. 7B. The binding energy values of oxygen 1s photoelectron were increased by 0.9 eV for Cr—O—C and 1.1 eV for Cr—O=C, which showed a similar trend shown in the Cu binding.

We used X-ray photoelectron spectroscopy (XPS) to detect the binding of metal ions to polydopamine. In polydopamine, two O1s photoelectron peaks were detected: one from the hydroxyl group of catechol ($\underline{O}$—C; 532.6 eV) and the other from the quinone oxygen generated by catechol oxidation ($\underline{O}$=C; 530.9 eV) (FIG. 2b, upper). Exposure of polydopamine to Cu resulted in an increase in the oxygen is core-level binding energies: 533.1 eV for Cu—$\underline{O}$—C (0.5 eV increase) and 531.7 eV for Cu—$\underline{O}$=C (0.8 eV increase). The binding energy values of O1s have been reported to increase upon metal binding. However, the lack of change in the binding energy of N1s upon Cu adsorption, as shown in FIG. 7a, indicated that nitrogen did not participate in the binding of $Cu^{II}$. However, a similar analysis of XPS binding-energy changes of both O1s and N1s orbitals upon exposure of polydopamine to Cr(IV) revealed similar changes in the O1s binding energy (FIG. 7b), as well as a 0.8 eV increase in N1s binding energy (401.4 eV to 402.2 eV) (FIG. 2c). Apparently, the nitrogen atom of polydopamine is involved in binding of Cr(IV), but not Cu(II). These results suggest that the site of metal chelation in polydopamine may vary according to the nature of the adsorbed metal ion.

The removal of radioisotopes from water has recently become a critical issue. Common sources of radioisotopes are nuclear power plants and hospitals. As demonstrated during the recent weather related destruction of nuclear power plants in Japan, radioisotopes can be released into the environment through radioactive water leakage from the reactor core and rain. Also, several radioisotopes have important medical imaging and therapeutic applications and are widely used in hospitals. Tracking and disposal of these and other radioisotopes is important for preserving the safety of the environment, and there are significant concerns related to inadvertent release of these compounds. Thus, a radioisotope adsorbent device is desirable.

Figure 3A:
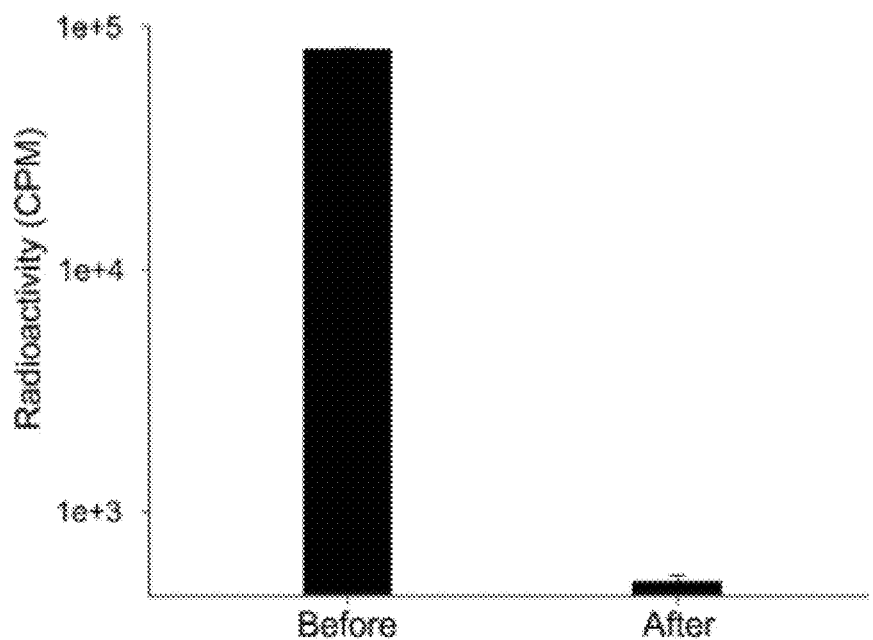
FIG. 3A. $^{177}$Lu radioisotope removal by a single passage through polydopamine/glass beads. Scintillation counts of the $^{177}$Lu-containing water before and after passing through the polydopamine/glass bead column (~30 mg). The loading concentration shown is 10 μC.
Figure 3B:
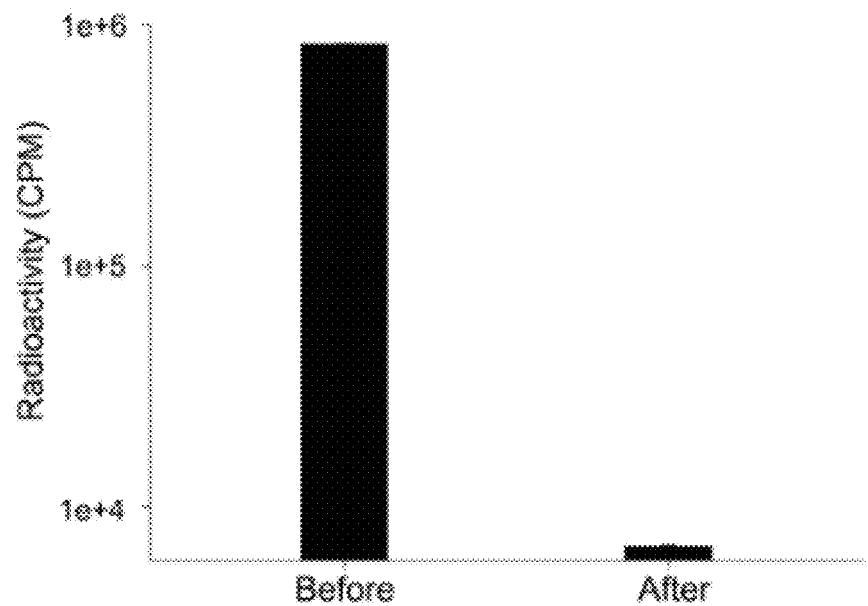
FIG. 3B. $^{177}$Lu radioisotope removal by a single passage through polydopamine/glass beads. Scintillation counts of the $^{177}$Lu-containing water before and after passing through the polydopamine/glass bead column (~30 mg). The loading concentration shown is 2000 μCi (n=3).

We tested whether polydopamine adsorbent can be used to remove a radioisotope from an aqueous liquid. We chose $^{177}$Lu as a model radioisotope because it has been widely used in radiotherapy and imaging. At 10 μCi (1.66 ng of $^{177}$Lu), 29.3 mg of polydopamine/glass beads removed nearly all $^{177}$Lu (99.5% n=3) in a single-pass filtration (FIG. 3a). Water containing a higher level of $^{177}$Lu radioactivity (2000 μCi was used to determine removal capacity of polydopamine/glass beads. Approximately 4% of the $^{177}$Lu was detected (n=3) (FIG. 3b) after a single passage, from which we calculated the removal capacity to be approximately 181,000 mCi/g polydopamine (1920 μCi$^{177}$Lu/10.6 μg polydopamine). Because the amount for a single dose of $^{177}$Lu for medical use is on the order of several tens of pCi, the adsorption capacity of only 30 mg of polydopamine/glass beads would be more than sufficient in practice.

Figure 4A:
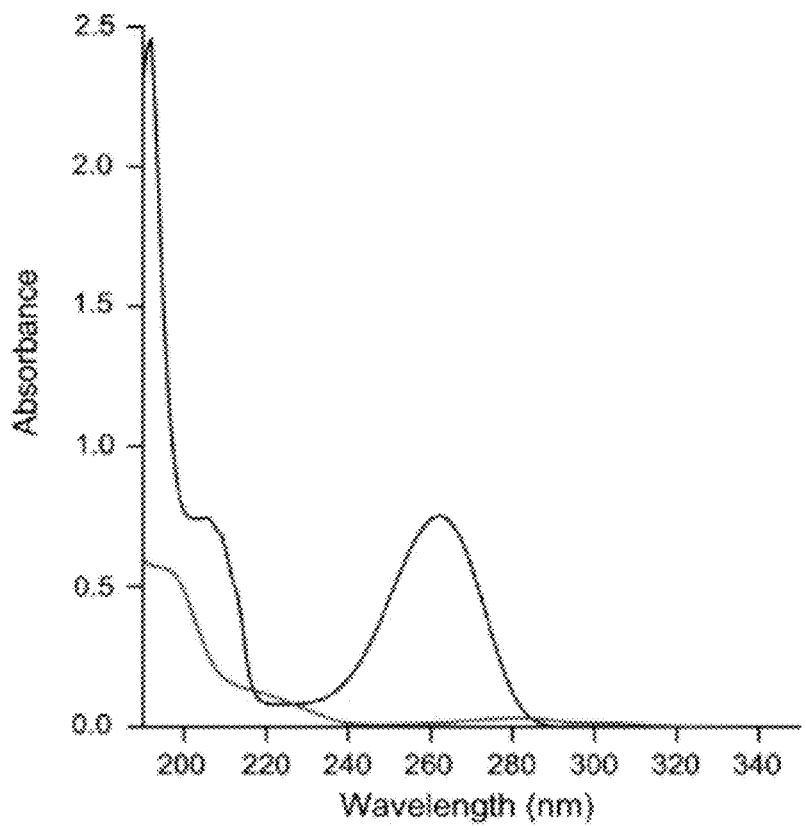
FIG. 4A. Detoxification of a toxic organic molecule by polydopamine UV-Vis analysis of 4-Apy before (upper line from 200-280 nm) and after (lower line from 200-280 nm) filtration.
Figure 4B:
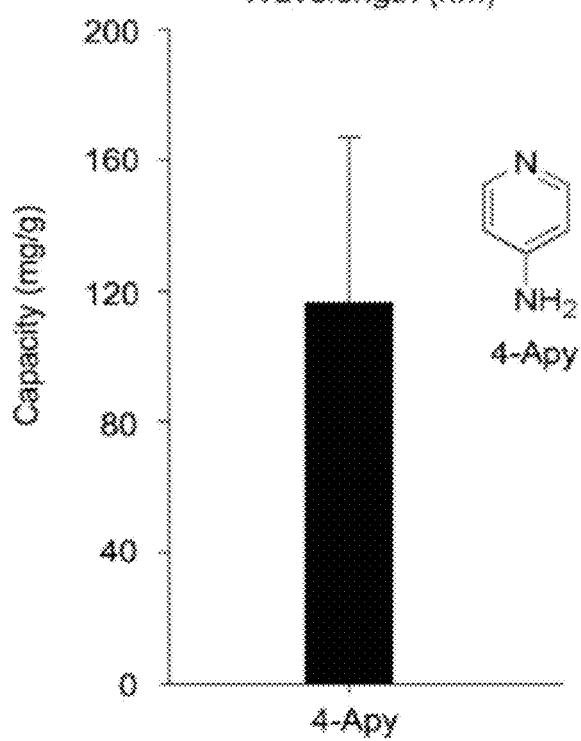
FIG. 4B. Detoxification of a toxic organic molecule by polydopamine. The adsorbent, polydopamine, removal capacity of 4-Apy (n=3).

Unlike widely used polysaccharide adsorbents, the polydopamine adsorbent was also able to remove toxic organic molecules. We chose 4-aminopyridine (4-Apy) as a model organic molecule, an insecticide with broad toxic effects on mammals. The optical property of 4-Apy exhibited a maximum adsorption at 260 nm (FIG. 4a). When solutions containing 4-Apy (10 μg/ml) were passed through a polydopamine/glass bead column, UV analysis showed the nearly complete disappearance of UV absorption characteristic of 4-Apy (FIG. 4a). The removal capacity was found to be approximately 116 mg of 4-Apy per gram of polydopamine, as determined by detecting unbound 4-Apy in the eluted solution by UV-vis spectrophotometry (FIG. 4b).

Figure 8:
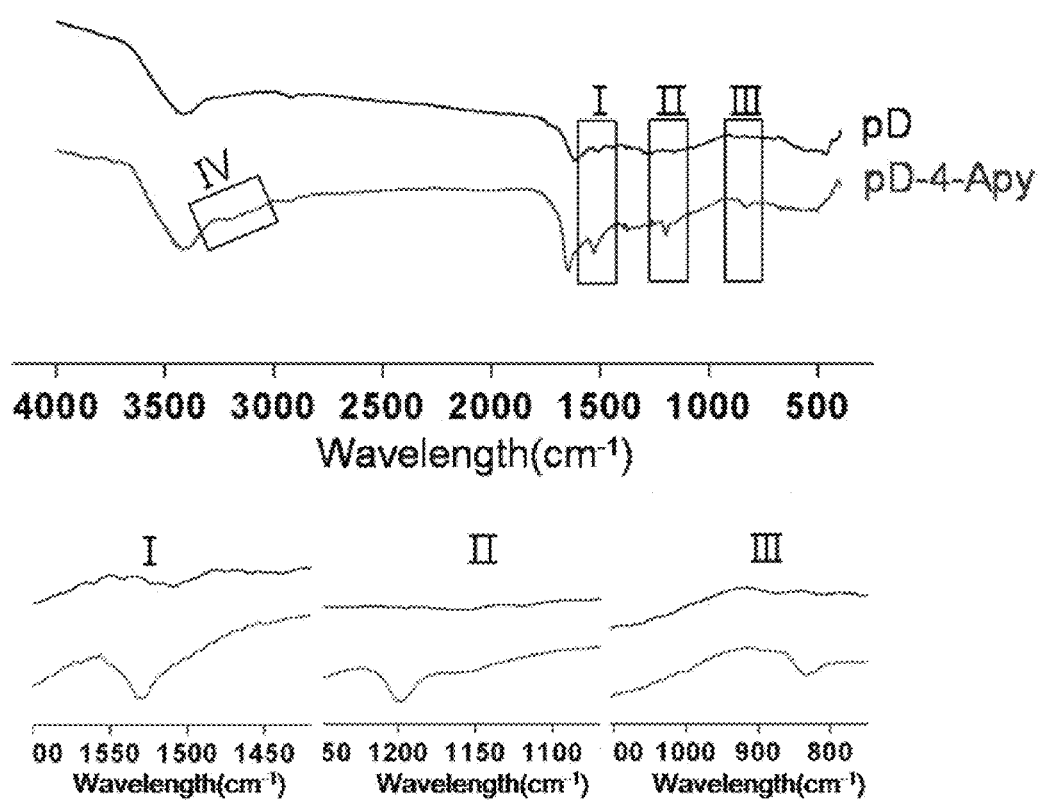
FIG. 8. FT-IR analysis of the polydopamine adsorbent before (upper line) and after binding of 4-Apy (lower line). Three distinct peaks that were not observed in polydopamine were detected (I, II, and III). These are indicative of the benzene ring of 4-Apy. In addition, secondary amine peaks at 3100-3300 cm$^{-1}$ (IV) were detected after 4-Apy adsorption.

Fourier-transformed-infrared (FT-IR) spectroscopy experiments using 4-Apy immobilized on the polydopamine adsorbent showed indications of the benzene ring (1531 cm$^{-1}$ for C—C stretching of an aromatic ring (I); 1199 cm$^{-1}$ for in-plane C—H bending (II); and 834 cm$^{-1}$ for out-of-plane C—H bending (III)) and secondary amine (3100-3300 cm$^{-1}$, IV) (FIG. 8), confirming the attachment of 4-Apy. The removal mechanism might be covalent binding of 4-Apy onto the polydopamine by Michael addition, or Schiff base formation.

Appropriate methods for regeneration of adsorbent and safe disposal of adsorbent/toxic compound complexes are equally important considerations in the development of new remediation technologies for toxic compounds. Currently, entire adsorbate/adsorbent complexes, such as metal/alginate/substrates or adsorbate/activated carbon are collected for disposal. In contrast, the polydopamine adsorbent exhibits the potential advantage of being able to be regenerated through treatment of polydopamine glass beads with dilute acid or hydrogen peroxide (FIG. 5a). The polydopamine layer remained intact after treatment in 10% acetic acid for 2 h, as indicated by the persistence of the polydopamine specific N1s photoelectron peak (398.1 eV) after the acid treatment (FIG. 5b). At the same time, the adsorbed toxic metals $Cu^{II}$ (FIG. 5b, Cu2p=932.6 eV), $Pb^{II}$ (Pb4f=138.3 eV), and $Cd^{II}$ (Cd3d=408.0 eV) were undetectable by XPS after treatment with acid, indicating their removal from the coating and regeneration of the polydopamine layer.

We found that complete removal of the polydopamine layer by treatment with hydrogen peroxide was necessary for recovery of 4-Apy. The XPS results showed that the polydopamine N1s peak completely disappeared after 1 h of exposure to 30% $H_2O_2$. Also, the underlying glass bead surfaces were exposed by this treatment, as indicated by the emergence of substrate-specific Si2p (100.1 eV) and Si2s (150.5 eV) peaks (FIG. 5c). In this case, the polydopamine coating can be re-applied to the regenerated beads so that a subsequent water detoxification procedure can be performed. The polydopamine coating-removal cycle was repeatable, which we confirmed by measuring the N1s peak between steps of several coating and removal cycles (FIG. 5d). Both regeneration methods offer the possibility for reuse of solid supports, which may translate into economic advantages over other technologies.

B. Methods and Materials

Polydopamine/Glass Beads.

A freshly prepared 2 mg/ml solution of dopamine hydrochloride (Sigma-Aldrich, Milwaukee, Ill.) in tris buffer (pH 8.0, 10 mM) was combined with 10 mg/ml of glass beads (Polysciences, bead size 30-50 μm). After 3 h on a rocker at room temperature, polydopamine/glass beads were separated from the reaction solution by centrifugation and decanting of the supernatant. Fresh $H_2O$ was then added to redisperse the beads. This process was repeated until the supernatant became transparent, and then the polydopamine/glass beads were freeze-dried.

Quantification of Polydopamine on Glass Beads.

Optical waveguide lightmode spectroscopy (OWLS, Microvacuum, Budapest, Hungary) was used to determine the mass of polydopamine coating per unit surface area of glass beads. Clean glass waveguides were mounted in the measurement head of the OWLS instrument, and a freshly prepared dopamine hydrochloride solution was injected in a stop-flow mode. The incoupling angles were recorded and converted to refractive indices by the manufacturer-supplied software. The do/dc parameter (n=refractive index, c=concentration) necessary for OWLS experiments was measured using a refractometer (Rudolph Research J157 Automatic Refractometer) (dn/dc=0.212 for polydopamine). The optical properties of the alkaline dopamine solution change with time, interfering with the OWLS optical measurements. Therefore, we injected a freshly prepared solution of dopamine four times during the course of measurement, as indicated in FIG. 6. The surface mass density of polydopamine coating determined using this method (1180 $ng/cm^2$; n=3) was then used to estimate the mass of polydopamine per unit mass of glass beads, taking into account the average diameter (40 μm) and the density (2.45 $g/cm^3$) of the glass beads.

Preparation of Polydopamine Glass Bead Column.

For the preparation of polydopamine/glass beads-packed column, 0.1 g (1 g for toxic organics) of polydopamine/glass beads were suspended in the distilled water. Polydopamine/glass beads suspension was then poured into the column. Water flow down was forced by gravity while polydopamine/glass beads stayed and packed in the column, because the pore size of the filter fitted in the bottom side of the column was too small for glass beads to pass through.

Xps Analysis.

XPS spectra were obtained on freeze-dried metal-bound polydopamine/glass beads using an Omicron ESCALAB (Omicron, Taunusstein, Germany) with a monochromatic AlKa (1486.8 eV) 300-W X-ray source, a flood gun to counter charging effects, and ultrahigh vacuum ($\sim 10^{-9}$ torr). The takeoff angle was fixed at 45°.

Metal Removal.

10 ppm metal solutions were prepared by diluting 1000 ppm atomic absorption standard solutions of $Cr^{VI}$, $Pb^{II}$, $Cd^{II}$, $Hg^{II}$ and $Cu^{II}$ (Sigma-Aldrich, Milwaukee, Ill.). The pH of each metal solution was maintained in the following ranges due to stability of each metal ion: $Cu^{II}$ in pH 4.2-4.9, $Hg^{II}$ in pH 3.5-4.0, $Cr^{VI}$ in pH 2.6-3.0, $Cd^{II}$ in pH 5.2-6.8, and $Pb^{II}$ in pH 4.0-5.4. ICP-OES analysis of the prepared 10 ppm solutions confirmed that metal precipitation did not occur. In a typical experiment, 10 mL of each metal solution were added onto a column containing 0.1 g of freeze-dried polydopamine/glass beads and allowed to flow forced by gravity. The metal concentration of the eluate was determined using inductively coupled plasma optical emission spectroscopy (ICP-OES, Varian Vista MPX, Varian, Palo Alto, Calif., USA). For each metal ion, measurements were taken at five different wavelengths, and the standard curve was generated by three standards (0.1, 1, 2 ppm, 5 ppm, 10 ppm) and a blank.

Radioisotope Adhesion.

The $^{177}Lu$ ($^{177}LuCl_3$) was produced by irradiation of $^{176}Lu$ in a reactor with high specific activity (KAERI, Daejeon, Republic of Korea). The radioactivity of $^{177}Lu$ stock solutions was measured using an ionizing chamber (Atomlab 200, Bio-dex), yielding a specific activity of 17.97 Ci/mg of lutetium and a volumetric activity of 8.17 Ci/0.5 ml. $^{177}Lu$ working solutions were prepared by dilution of this stock solution with 50 mM HCl to obtain a desired volumetric activity. For comparison purposes, a cold $^{176}Lu$ ($LuCl_3$, Sigma-Aldrich, Milwaukee, Ill.) solution was also prepared at a concentration of 1000 ppm (1 mg/ml). A 200 μl of $^{177}Lu$ solution in 50 mM sodium acetate buffer (pH 5.5) was passed through the column packed by ~30 mg of polydopamine/glass beads. The eluate was passed through a syringe filter (0.2 μm). Residual radioactivity in a 100 μL aliquot of filtrate was determined with a Wallac 1470 Wizard automated gamma counter (Perkin Elmer Life Sciences).

Removal of Toxic Organic Compounds.

4-Apy (Sigma-Aldrich, Milwaukee, Ill.) was dissolved in water at 10 μg/ml and passed through a column containing 1 g of the polydopamine/glass beads. The concentration of the compound in the eluate was measured on a UV-Vis spectrophotometer (HP-8453, Agilent, USA). The standard curve was generated by five standards (0.2, 0.4, 0.8, 1.6, 3.2, 6.4 ppm) and a blank.

FTIR Analysis.

FT-IR spectra were recorded on freeze-dried polydopamine and 4-Apy-bound polydopamine using a Vector 33 (Bruker, Germany). Thirty scans were averaged to yield spectra with a resolution of 4 $cm^{-1}$.

Regeneration of Polydopamine/Glass Beads.

One mL of dilute acetic acid (10% v/v) was added to 100 mg of freeze-dried metal-bound polydopamine/glass beads for 2 h. The beads were subsequently washed with $H_2O$ and freeze-dried for further XPS analysis. Alternatively, 2 ml of 30% hydrogen peroxide (Sigma-Aldrich, Milwaukee, Ill.) were added to 1 g of polydopamine/glass beads for 1 h according to a published procedure for bleaching melanin. Korytowski, W.; Sarna, T., *J. Biol. Chem.* 1990, 265, 12410-12416. The beads were then washed and freeze-dried for XPS analysis.

C. Conclusion

In summary, we have described a novel, facile, and scalable method for batch or continuous flow removal of toxic heavy metals and organic compounds from water. The method exploits a simple and versatile approach to coating solid supports with an adherent film of polydopamine film that exhibits a high affinity for metal ions and certain organic compounds. The method is inexpensive, scalable, and the solid supports can be easily regenerated by treatment in dilute acid or hydrogen peroxide.

To our knowledge this constitutes the first report of polydopamine use related to environmental remediation, adding to a rapidly growing list of uses for polydopamine coatings.

The above description and attached figures are intended to be illustrative and not limiting of the invention, which is defined by the appended claims.

We claim:

1. A method for removing one or more metal ions from water, the method comprising contacting the water with an adsorbent comprising a polydopamine polymer coated onto a substrate surface, whereby the one or more metal ions are adsorbed to the polydopamine polymer adsorbent and removed from the water; and removing the adsorbent and the adsorbed metal ions from the substrate surface by contacting the adsorbent with hydrogen peroxide.

2. The method of claim 1, wherein the polydopamine polymer is the polymer obtained by contacting a substrate surface with an alkaline solution comprising dopamine.

3. The method of claim 1, wherein the substrate comprises a substance selected from the group consisting of glass, a metal, an oxide, a semiconductor, a ceramic, and a second synthetic polymer.

4. The method of claim 3, wherein the substrate is a glass bead.

5. The method of claim 1, wherein the water is contacted with the adsorbent comprising the polymer by batch or continuous flow, wherein the polymer is natural or synthetic.

6. The method of claim 1, further comprising the step of coating fresh adsorbent onto the substrate surface.

7. The method of claim 1, wherein the metal ion is the ion of a toxic metal.

8. The method of claim 7, wherein the toxic metal ion is selected from the group consisting of copper (II), chromium (VI), mercury (II), cadmium (II), and lead (II).

* * * * *